United States Patent [19]

Wilk

[11] Patent Number: 5,661,262

[45] Date of Patent: Aug. 26, 1997

[54] HORN GAP ADJUSTMENT MECHANISM

[76] Inventor: Edward J. Wilk, 1112 N. Grove Ave., Oak Park, Ill. 60302

[21] Appl. No.: 704,396

[22] Filed: Aug. 23, 1996

[51] Int. Cl.⁶ .................................................... H02G 13/00
[52] U.S. Cl. ............................................................ 174/2
[58] Field of Search .................. 174/2, 3, 4 R; 361/137, 138, 134, 135

[56] References Cited

U.S. PATENT DOCUMENTS

| | | | |
|---|---|---|---|
| 1,177,841 | 4/1916 | Young | 361/131 |
| 1,179,722 | 4/1916 | Heinritz | 361/135 |
| 1,277,978 | 9/1918 | Martin et al. | 361/137 |
| 1,356,720 | 10/1920 | Jacobs | 361/137 |
| 1,755,324 | 4/1930 | Jacobs | 361/137 |
| 2,135,353 | 11/1938 | Rorden | 361/137 |
| 2,545,660 | 3/1951 | Graybill | 361/105 |
| 4,283,747 | 8/1981 | Perkins, Jr. | 361/117 |
| 4,320,432 | 3/1982 | Duenke | 361/39 |
| 4,399,421 | 8/1983 | MacLean | 335/174 |

*Primary Examiner*—Hyung S. Sough
*Assistant Examiner*—Kamand Cuneo
*Attorney, Agent, or Firm*—Philip H. Kier

[57] ABSTRACT

An improved mechanism for adjusting the distance between the electrodes of lightning arresters, particularly of the horn gap type, used to protect ungrounded antenna systems. The adjustment mechanism is insulated from the hot electrode so that the hot electrode can be moved to adjust the gap between the electrodes while the antenna is radiating power. The hot electrode is attached to an insulator placed on a base. The position of the base on a slide track can be changed by use of a screw mechanism. Springs help keep the base in place after the adjustment is made.

4 Claims, 3 Drawing Sheets

HORN GAP ADJUSTMENT MECHANISM

BACKGROUND

This invention pertains to horn gaps, a type of lightning arrester used to protect ungrounded antenna systems. More specifically, this invention pertains to an improved mechanism for adjusting the width of the gap between the electrodes of this device without requiring that the antenna's radiating power be shut off.

Horn gaps have been used as lightning arresters since early in the twentieth century. They typically contain two bent metal rods separated by a gap that function as electrodes, and which can be described as roughly looking like a pair of animal horns. One rod, the cold horn, is grounded, while the other rod, the hot horn is not. The function of the horn gap is to flash over lightning energy to ground initially and then to dissipate the lightning energy to ground between the horns of the gap. It is used to protect the components and insulators of ungrounded antenna systems such as those commonly used as standard AM radio stations, "T" type antennas, curtain antennas or any other antenna system whose structure is required to be above ground potential.

Certain methods of modulation, especially amplitude modulation (AM) create substantial variation in power level. An amplitude modulated carrier varies in power level from 0 to 250 percent of carrier power. For a 50,000 watt power level carrier, the power varies instantaneously from 0 watts to 125,000 watts. It is difficult to obtain the proper gap width of a lightning arrester. If the gap is set too small, the gap will flash over upon normal modulation. If the gap is set too wide, the gap will not flash over soon enough and lightning damage will occur. A balance must be obtained empirically between a gap width that will not flash over under normal power level variations from modulation, but will flash over in the presence of lightning. A proper gap width may range between 1.0 cm and 2.5 cm. A lightning arrester, therefore, has means to adjust the gap width. In a conventional horn gap lightning arrester, such as taught by Jacobs in U.S. Pat. No. 1,755,324, a portion of a horn can be slid in a bracket. When an appropriate gap width is reached a set screw can be tightened to secure the horn's position. In such a design, the position of the horn cannot be changed while the antenna is radiating power because the mechanism for changing the gap width is at above ground potential and there is risk of severe electrical shock, burns, or even electrocution. In conventional designs, the radiating power is turned off, an adjustment is made to the hot horn and then radiating power is reapplied. This procedure is repeated until it is believed a correct setting is achieved. This setting cannot be changed until the operation can be shutdown again for readjustment. Thus the object of the instant invention to provide a mechanism for adjusting the width of the gap in a lightning arrestor that can be used when the antenna is radiating power. Being able to adjust the width while the antenna is radiating power facilitates finding a proper setting because the flashing will occur under normal power variations when the gap width is too small.

SUMMARY

In the instant invention, the grounded horn is attached to a grounded mounting plate. Also attached to the grounded mounting plate is a slide track. The hot horn is attached to an insulator, which is attached to a base that can slide on the slide track. There is a screw mechanism that adjusts the position of the base on the slide track. As the base is integrally attached to the hot horn, the width of the gap between the hot horn and the grounded horn is adjusted as the position of the base is adjusted. To keep the base in place, loading springs apply tension to it. As the sliding track and base are kept at zero electrical potential, even while the antenna is radiating power, the width of the gap between the two horns can be adjusted at any time, not only when the antenna is not radiating power as with conventional horn gap lightning arresters.

DETAILED DESCRIPTION OF THE PREFERRED EMBODIMENT

Figure 1:
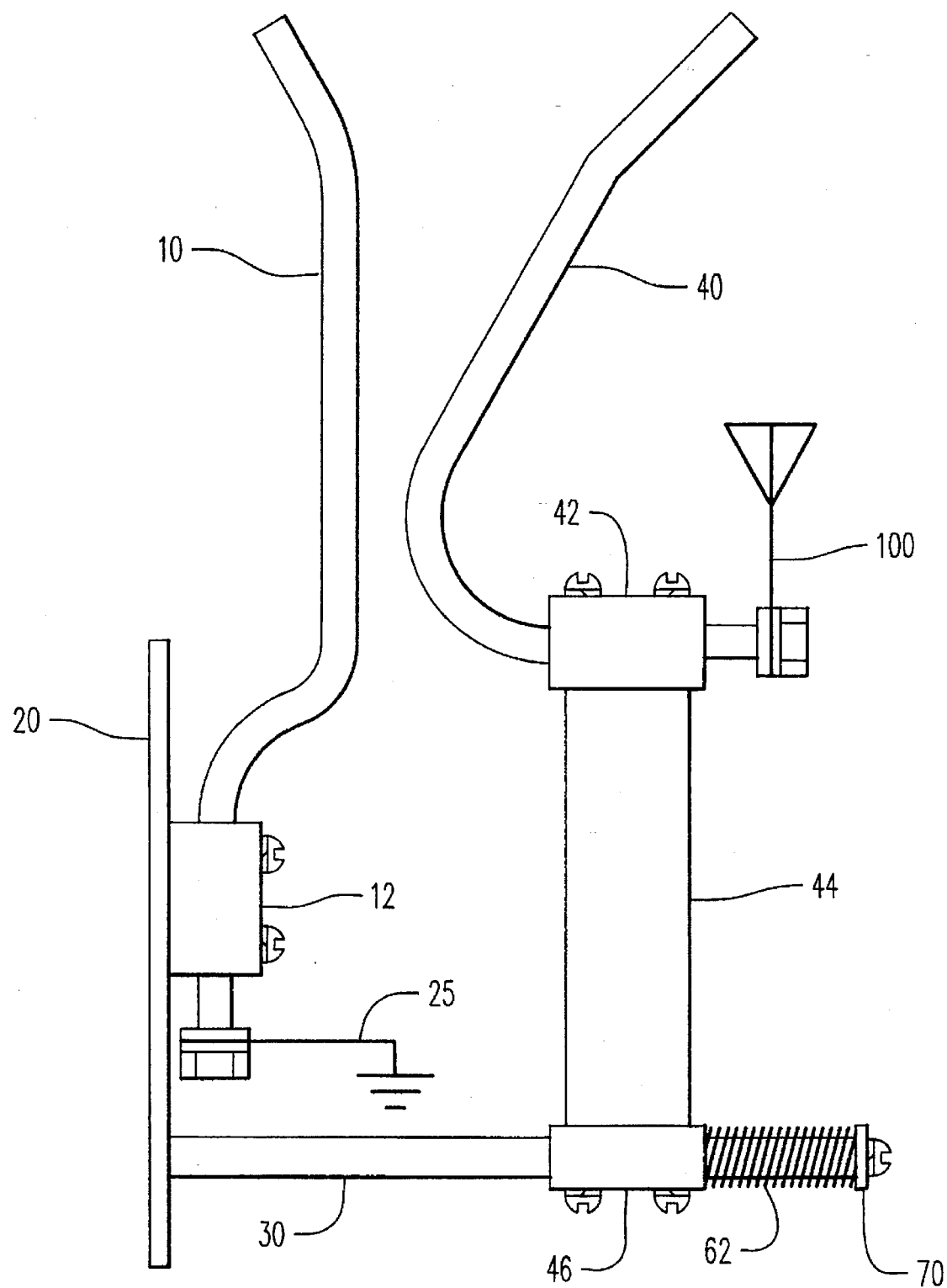
FIG. 1 is a side elevation of a lightning arrester with horn-shaped electrodes.
Figure 2:
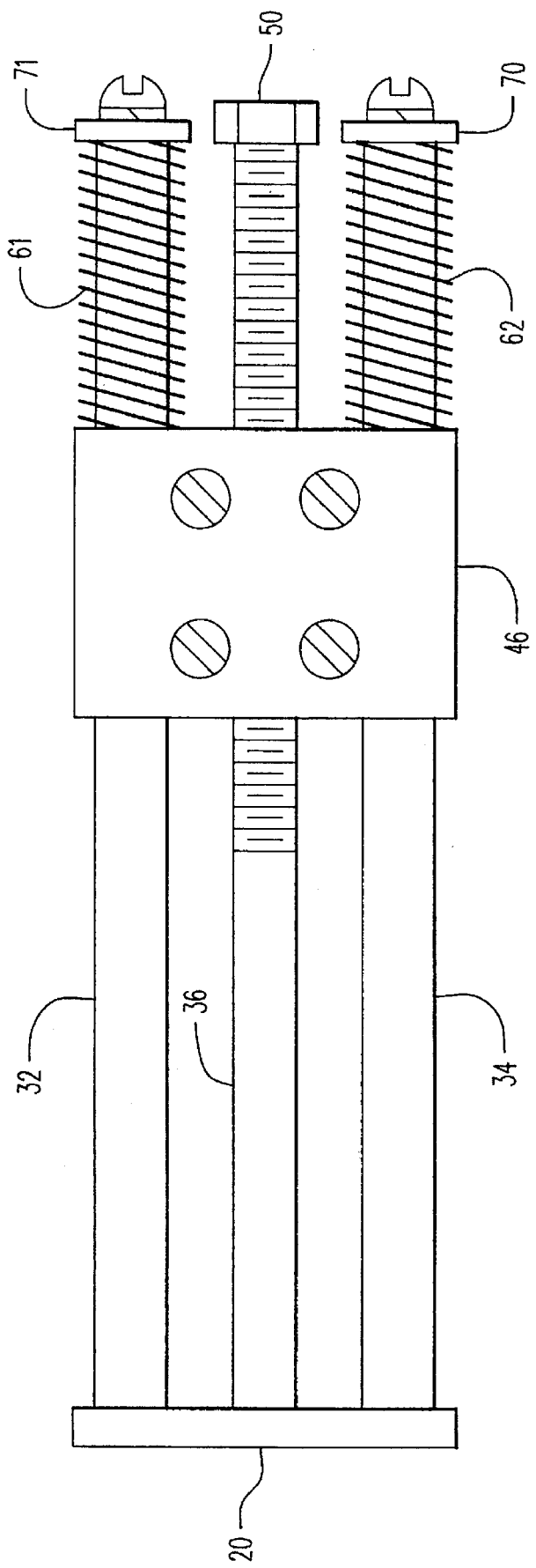
FIG. 2 is a bottom view of the gap adjustment mechanism of a lightning arrester.

With reference to FIG. 1 and FIG. 2, a bowed metallic rod 10, known as the grounded or cold horn, is attached to a holder 12, which in turn is attached to a grounded mounting plate 20. There is a lead from the holder or grounded mounting plate to ground 25. Attached to the grounded mounting plate is a slide track 30. In the preferred embodiment, the slide track has two rails 32 and 34 that are attached to the grounded mounting plate. Typically, the grounded mounting plate is vertical and the slide plate is horizontal. Another bowed metallic rod 40, the hot horn, is attached to a hot holder 42, which is attached to an insulator 44, which might be cylindrical as shown in the drawings. There is a lead from the hot holder to an antenna 100. The insulator is integrally attached to a base 46. The cold horn and the hot horn are in a vertical plane that is perpendicular to the grounded mounting plate. The base 46 has grooves or holes that allows it to move and keep on the slide track 30. The position of the base on the slide track is adjusted by means of a screw system. In the preferred embodiment the screw system contains an adjustment screw 50 that passes through a threaded bore in the base. The adjustment screw abuts a rod stop 36 that is attached to the grounded mounting plate. When the adjustment screw is turned, this contact with the rod stop causes the base 46 to move. The adjustment mechanism also contains die springs 61 and 62 that apply tension to the base and prevent the base from changing position after the adjustment is made. Each die spring envelops a rail and is placed between the base and an end termination 70, such as a fender washer, which is held in place by a screw tapped into the rail.

The width of the gap between the hot horn and the cold horn is readily adjusted in this invention. A screwdriver is applied to an end of the adjustment screw. If the adjustment screw has a hex head, then a wrench-like tool is used. This cause the base 46 to move on the slide track 30. As the base, insulator 44, holder 42, and hot horn 40 are integrally connected the distance between the hot horn and the cold horn 10 is adjusted by the movement of the base. A proper gap setting is found by setting the gap wider than normal and then under power slowly narrowing the gap until the gap begins to flash under normal modulation. The gap is then slowly widened until it no longer flashes under normal modulation. At this point, maximum lightning protection is obtained.

Figure 3:
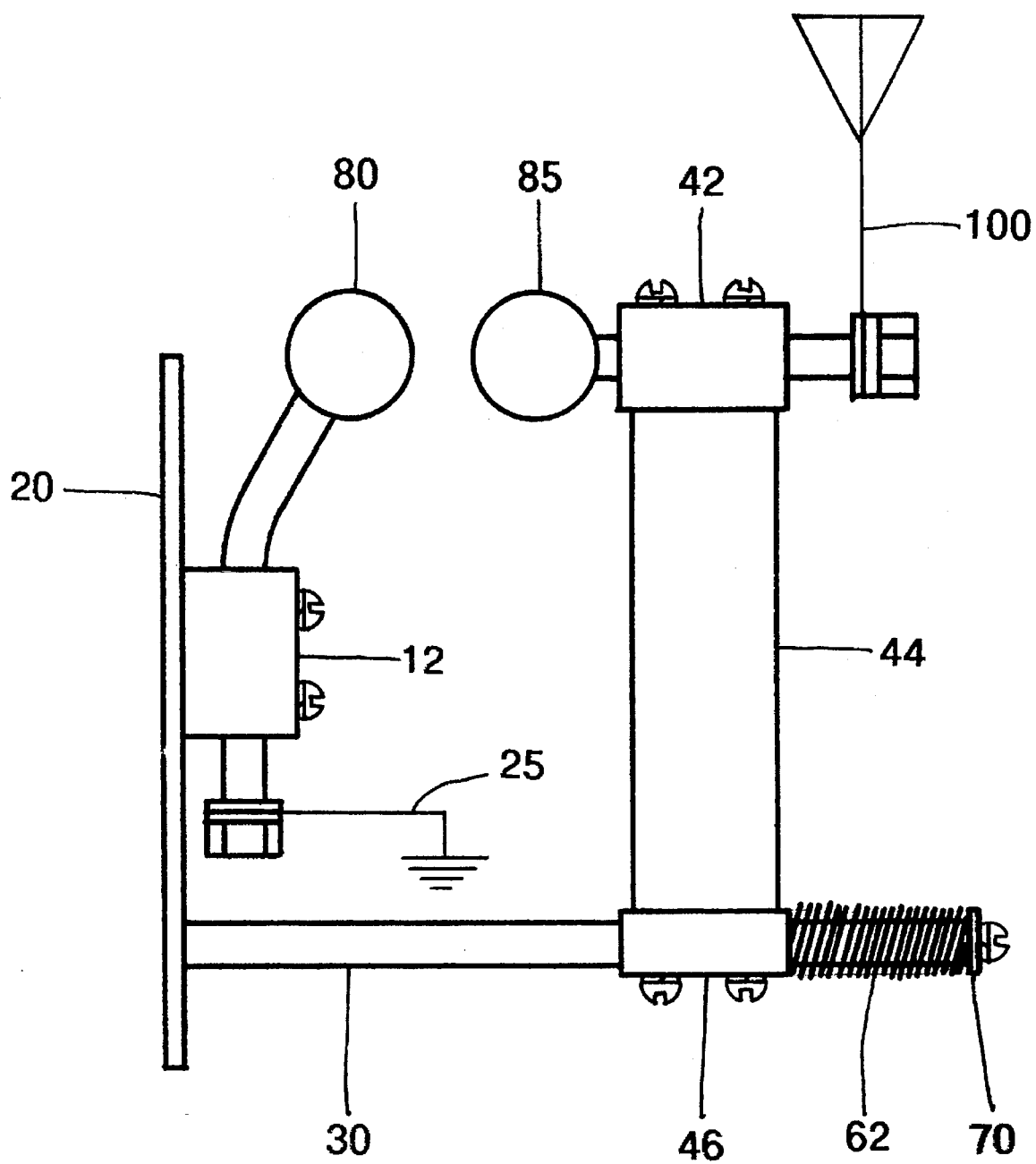
FIG. 3 is a side elevation of a lightning arrester with ball electrodes.

The mechanism for adjusting the width of the gap between electrodes of an lightning arrestor system is not restricted to horn-shaped electrodes. It can be applied to lightning arresters having electrodes in the shape of spheres. This type of lightning arrester is called a ball gap lightning arrester. FIG. 3 shows a lightning arrester in which lightning is flashed between a spherical grounded electrode 80 and a spherical hot electrode 85. The hot electrode is attached to an insulator that is attached to a base that can slide on a slide track as for the horn gap lightning arrester.

I claim:

1. A lightning arrester for an ungrounded antenna system comprising:

a grounded electrode;

a mounting plate to which the grounded electrode is attached;

a slide track with a plurality of rails; an end of each of said rails being attached to the mounting plate;

an electrically hot electrode separated from the grounded electrode;

an insulator, an end of the insulator being attached to the electrically hot electrode and another end being attached to a base, the base having passages through which the rails pass and having a threaded internal surface;

an elongated element attached to the grounded mounting plate;

a screw passing through the threaded internal surface of the base and in contact with the elongated element;

a die spring enveloping each of said rails, said die spring have an end in contact with the base and another end in contact with an end termination.

2. A lightning arrester for an ungrounded antenna system as set forth in claim 1 wherein the grounded electrode and the electrically hot electrode are each bowed metal elements.

3. In a lightning arrester for an ungrounded antenna system having a grounded electrode attached to a mounting plate and an electrically hot electrode with a gap between the grounded electrode and the electrically hot electrode, a mechanism for adjusting the gap comprising:

a slide track with a plurality of rails; an end of the slide track being attached to the mounting plate;

an insulator, an end of the insulator being attached to the electrically hot electrode and another end being attached to a base, the base having passages through which the rails pass and a threaded internal surface;

an elongated element attached to the grounded mounting plate;

a screw passing through the threaded internal surface of the base and in contact with the elongated element;

a die spring enveloping each rail, said die spring having an end in contact with the base and another end in contact with an end termination.

4. An adjusting mechanism as set forth in claim 3 wherein the end termination is a fender washer and wherein the fender washer is held in place by a screw tapped into the rail.

* * * * *